E. SCHNEIDER.
ELECTRICAL APPARATUS FOR INDICATING AND REPEATING MOVEMENTS AT A DISTANCE.
APPLICATION FILED SEPT. 13, 1918.

1,402,096.

Patented Jan. 3, 1922.

3 SHEETS—SHEET 1.

Inventor
Eugene Schneider
by
Mauro, Cameron, Lewis & Massie
Attorneys.

E. SCHNEIDER.
ELECTRICAL APPARATUS FOR INDICATING AND REPEATING MOVEMENTS AT A DISTANCE.
APPLICATION FILED SEPT. 13, 1918.

1,402,096.

Patented Jan. 3, 1922.

3 SHEETS—SHEET 2.

Inventor
Eugene Schneider by
Mauro, Cameron, Lewis & Massie
Attorneys

E. SCHNEIDER.
ELECTRICAL APPARATUS FOR INDICATING AND REPEATING MOVEMENTS AT A DISTANCE.
APPLICATION FILED SEPT. 13, 1918.
1,402,096.
Patented Jan. 3, 1922.
3 SHEETS—SHEET 3.
Fig. 6. Fig. 7.
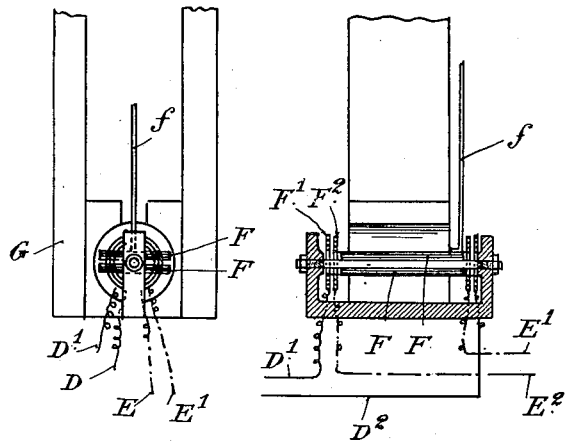
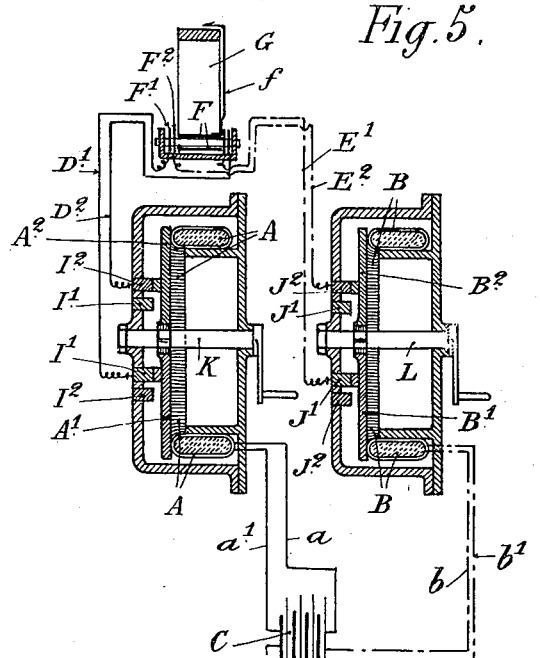
Fig. 5.

UNITED STATES PATENT OFFICE.

EUGÈNE SCHNEIDER, OF PARIS, FRANCE, ASSIGNOR, BY MESNE ASSIGNMENTS, TO JOSEPH LOUIS ROUTIN, OF PARIS, FRANCE.

ELECTRICAL APPARATUS FOR INDICATING AND REPEATING MOVEMENTS AT A DISTANCE.

1,402,096.   Specification of Letters Patent.   Patented Jan. 3, 1922.

Application filed September 13, 1918. Serial No. 253,990.

*To all whom it may concern:*

Be it known that I, EUGÈNE SCHNEIDER, a citizen of the French Republic, and a resident of 42 Rue d'Anjou, Paris, France, have invented a new and useful Improvement in an Improved Electrical Apparatus for Indicating and Repeating Movements at a Distance, which invention is fully set forth in the following specification.

The known principle of the Wheatstone bridge has, as is well known, received numerous applications for transmitting to a distance the indications of angular displacements imparted to a movable body situated at a transmitting station, and thus allowing of repeating said displacements with a movable body situated at a distant receiving station.

Figure 1:
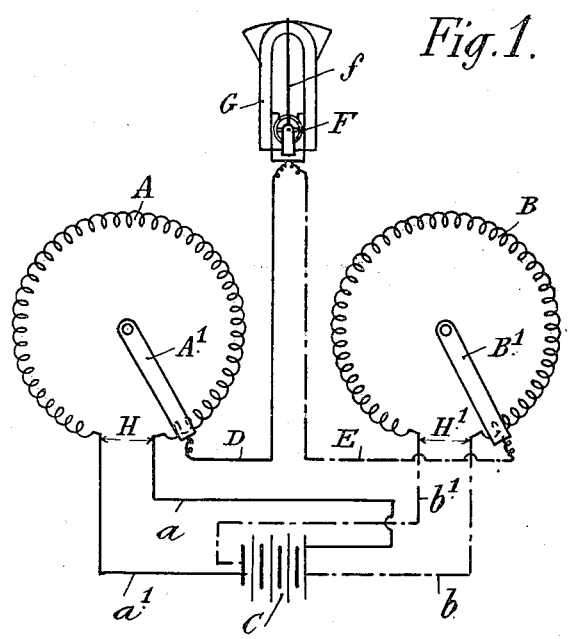
Figure 2:
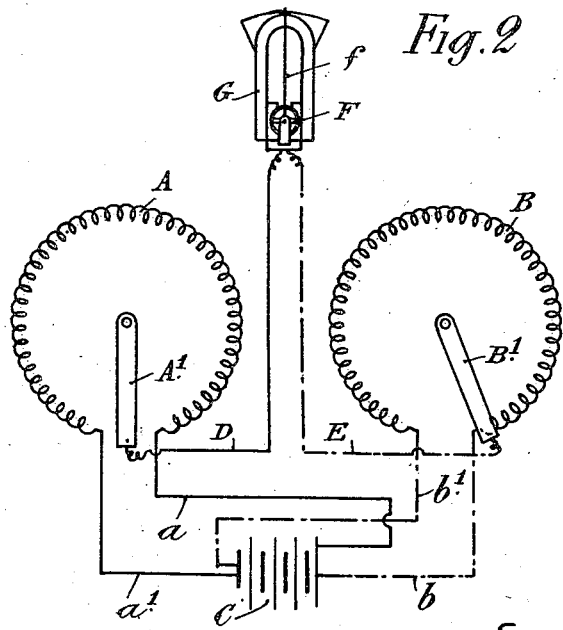
Figure 3:
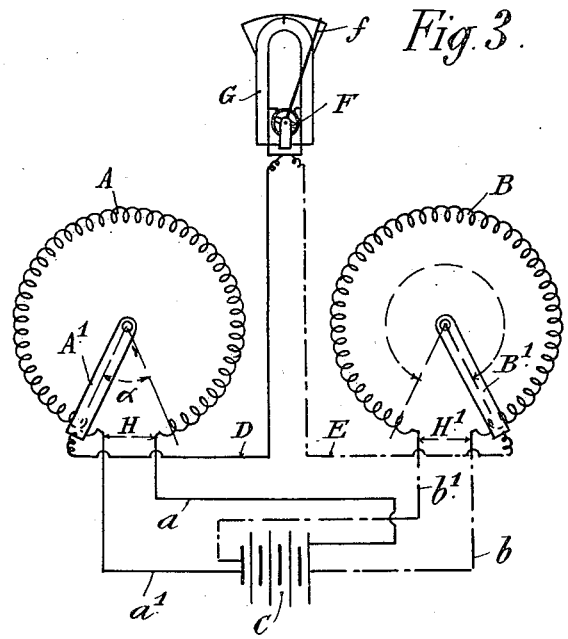
Figure 4:
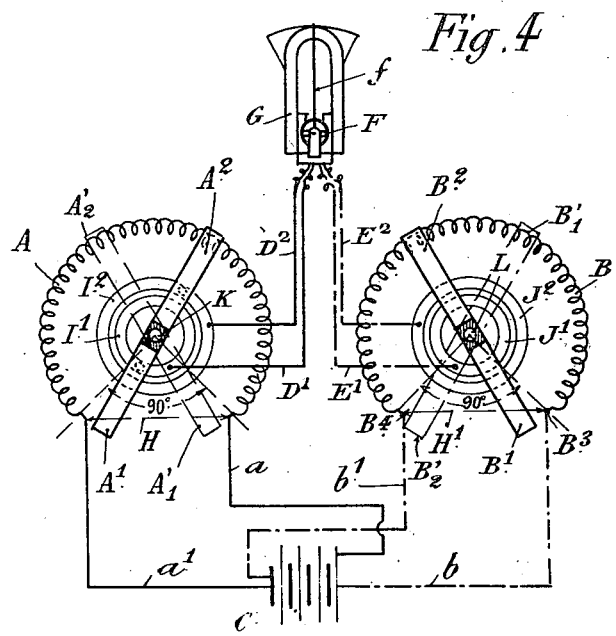

In the drawings, Figs. 1, 2 and 3 are diagrammatical views illustrating known apparatus employing the broad principle involved; Fig. 4 is a diagram of the general arrangement of the apparatus employed in the present invention; Fig. 5 is a vertical sectional view showing the double-brush rheostats of the transmitting and receiving stations and their connections to the source of current and to the galvanometer situated at the receiving station; Figs. 6 and 7 are respectively an end elevation and a longitudinal sectional view of the galvanometer on an enlarged scale.

Referring to Fig. 1, two identical annular rheostats A and B situated one at the transmitting station and the other at the receiving station, are branched in parallel off one and the same current supply C which is situated at one of the stations or at any intermediate point. Brushes $A^1$, $B^1$ pivoted at the centers of their respective rheostats are arranged to move over the contacts of the said rheostats. These brushes $A^1$ and $B^1$ are connected respectively by leads D and E to the movable coil F of a galvanometer or voltmeter comprising a magnet G. $f$ is the needle of the said galvanometer or voltmeter which makes the same movements as the movable coil F.

It is known that when the two brushes $A^1$ and $B^1$ are placed parallel in such a manner as to be at the same potential, the coil F will remain parallel to the line of the poles of the magnet G, and the needle $f$ will remain stationary at the zero of the voltmeter. Therefore if the brush $A^1$ is assumed to be actuated at the transmitting station, then generally for the purpose of repeating exactly its movements at the receiving station by movements of the same amplitude of the brush $B^1$, it will be sufficient to actuate the latter in such a manner as to maintain the needle $f$ at zero.

In practice, the movable brush $A^1$ will be connected by a lead to a mechanism to be moved, such as for instance a gun or a gun carriage. In order that for producing very slight angular displacements of the mechanism to be moved, the brushes of the rheostats shall describe a sufficiently large arc, it will be advisable to provide a motion-multiplying device between the mechanism and the brush, so as not to be compelled to employ rheostats of too large dimensions. This arrangement causes the brushes to make a number of revolutions which is a multiple of that executed by the mechanism to be actuated. This solution has in addition to the advantage of less bulk for the rheostats, the further advantage of facilitating their working with a current of lower voltage.

On the other hand however the multiplication of the motion between the mechanism to be moved and the brushes $A^1$ and $B^1$ constitutes a serious disadvantage which is due to the necessity of causing the brushes to pass over the unavoidable gap (H, $H^1$) existing between the ends of the respective resistances A and B.

The oscillations of the voltmeter needle serve as a guide to the operator at the receiving station for the movements which he is to execute, and therefore the said needle should by its deflection, indicate to him the direction of the movement to be made in order to return to zero. This direction of course must always be the same for a deviation in the same direction. But, as shown in the diagrammatic Fig. 2, it may happen that the brush $B^1$ in rotating in a clockwise direction and being situated at a few turns away from the gap $H^1$, that is to say, upon the initial turns of the rheostat B, may be slightly lagging behind the brush $A^1$, which latter is already in the gap H. In such a case the brush $A^1$ will break the circuit through the voltmeter which will then cease giving any indications, and then after having passed over the gap H, it will come suddenly into contact with the final turns of the rheostat A, as shown in the diagrammatic Fig. 3. The potential difference between the brushes B¹ and A¹, which was nil or only slight before the arrival of the brush A¹ at the gap H, will suddenly become very great and of reverse direction (Fig. 3), which will be indicated by a sudden deflection of the needle $f$ in the opposite direction. The result of this is that the operator at the receiving station, who is following the movements of the said needle, will be caused to turn the mechanism actuated by him, in the opposite direction to the original one. On the whole, instead of turning the said mechanism in the clockwise direction through the angle $\alpha$ which represents the angular distance between the brushes B¹ and A¹, he will under these conditions, turn the mechanism in the opposite direction through an angle equal to $360° - \alpha$. The operation can therefore become wrong to the extent of almost an entire revolution.

The present invention has for its object to provide improvements which will remedy these drawbacks as far as possible.

According to this invention, the continuity of the indications, that is to say, the continuity of action upon the galvanometer needle is assured by employing at each rheostat, a double brush, or more strictly speaking, two brushes 180° apart mounted on the same axle and transmitting to the galvanometer by means of two separate rings connected to separate coils, current from the source of supply, taken at two diametrally opposite points of the rheostat.

It is to be understood that however great the gaps H, H¹ may be, provided each gap is less than 180°, one at least of the pairs of brushes will receive current from the source of supply. The increasing of the said gap to the possible maximum, reduces to a minimum the risk of sudden changes of direction of the needle, because it will be necessary that a correspondingly increased lag of one of the brushes should take place relatively to the other in order to produce such changes.

According to this invention therefore the gap of the rheostat extends over an arc of 90° or approximately 90° for reasons hereinafter stated.

As shown in Fig. 5, two brushes A¹, A² and B¹ and B² respectively are mounted 180° apart on the same axle K, L respectively, and are adapted to move with one of their faces in contact with the same rheostat A, B.

These brushes situated each in aligned prolongation of the other, rub with their opposite faces upon two separate rings I¹, I² at the transmitting station and J¹, J² at the receiving station. The rings I¹ and J¹ are connected respectively by leads D¹ and E¹ to one of the coils F¹ of a double coil voltmeter F, to the other coil F² of which the rings I², J² are connected respectively by the leads D² and E².

It will be readily understood that provided the gap H, H¹ extends over less than 180°, one of the brushes A¹ or A² will always be situated upon the active portion of the rheostat; the same will be the case for one of the brushes B¹ or B².

It is clearly an advantage to increase the gap as much as possible whilst leaving it smaller than 180°, in order that the voltmeter shall have a deflection in an abnormal direction only for the greatest possible lag of one of the brushes behind the other, or in other words, in order to avoid the drawback demonstrated by the diagrammatic Fig. 3.

Nevertheless it may happen that the differences in position between the connected brushes A¹ and B¹ on the one hand and A² and B² on the other hand, may be such that a brush of one of the pairs, for instance A¹, will arrive at the gap H (this position being indicated in dot and dash lines at A'₁ in Fig. 4) at the same time as the opposite brush B² of the other pair has arrived at the gap H¹ (position indicated at B'₂). The voltmeter will then receive no current at all since both brushes A'₁ and B'₂ are in open circuit position for both voltmeter coils and the fact that brush A₁ is insulated from brush A² and B₁ from B₂ as indicated in the drawings.

This case will occur the more seldom the smaller the gap H, H' or the greater the arc of possible lag B³, B'₁ between two corresponding brushes.

Finally, the conditions become such that on the one hand the gap H¹ must be as large as possible, whilst on the other hand the arc B³, B'₁ must also be as large as possible, the sum of gap H¹ plus arc B³, B'₁ being less than 180°. Both these two conditions will be best fulfilled when the gap H¹ is equal to the arc B³, B'₁, that is to say, when they are each approximately 90°.

The gaps should therefore be approximately 90°.

Having now described my invention what I claim as new and desire to secure by Letters-Patent is:—

1. Apparatus for controlling angular movements at a receiving station from a transmitting station comprising a Wheatstone bridge having in one branch an arc-shaped resistance wherein the gap of the rheostat extends over substantially 90° and located at the transmitting station and in the companion branch a similar resistance located at the receiving station, separate contact arms diametrically disposed and revolubly mounted and adapted to move over the curved resistance at each station, two bridge circuits having ring terminals concentrically arranged at each station and having sliding contact with said contact arms, and a voltmeter provided with two separate energizing coils included in said bridge circuits.

2. Apparatus for controlling angular movements at a receiving station from a transmitting station comprising a Wheatstone bridge having in its branches symmetrically arranged arc-shaped rheostats each covering an arc of 270°, ring terminals concentric with each of said rheostats, diametrically opposed contacts individual to said ring terminals and movable in contact with said rheostats, balance circuits connecting corresponding contacts at said stations and providing uninterrupted circuit connections between said stations whereby a possible separation of 90° of the two sets of contacts is possible without disturbance in the operation of transmission.

In testimony whereof I have signed this specification.

EUGÈNE SCHNEIDER.

Witnesses:
 ANDRÉ MOSTICKER,
 JOHN F. SIMONS.